US012587495B2

(12) United States Patent
Natoli et al.

(10) Patent No.: US 12,587,495 B2
(45) Date of Patent: Mar. 24, 2026

(54) ELECTRONIC MESSAGE GENERATION

(71) Applicant: Klaviyo, Inc., Boston, MA (US)

(72) Inventors: Charles T. Natoli, San Francisco, CA (US); Sarah Delaney, Jackson, WY (US); Alexandra Holness, Framingham, MA (US); Xiao Liu, Orinda, CA (US); Devin Patel, Boston, MA (US); Rachelle Jensen, Henderson, NV (US); Imogen Schofield, Somerville, MA (US); Marilyn Cora Hampton, Worcester, MA (US); Shresth Bhatnagar, Boston, MA (US); Apra Gupta, Boston, MA (US); Lindsey Curran, Cambridge, MA (US); Kyle Knight, Godfrey, IL (US); Christopher Fox, Westport, CT (US)

(73) Assignee: Klaviyo, Inc., Boston, MA (US)

( * ) Notice: Subject to any disclaimer, the term of this patent is extended or adjusted under 35 U.S.C. 154(b) by 0 days.

(21) Appl. No.: 18/632,700

(22) Filed: Apr. 11, 2024

(65) Prior Publication Data

US 2025/0323888 A1      Oct. 16, 2025

(51) Int. Cl.
*H04L 51/063* (2022.01)
*G06F 40/109* (2020.01)
(Continued)

(52) U.S. Cl.
CPC .......... *H04L 51/063* (2013.01); *G06F 40/109* (2020.01); *H04L 51/02* (2013.01); *H04L 67/535* (2022.05)

(58) Field of Classification Search
CPC ..... H04L 51/063; H04L 67/535; H04L 51/02; G06F 40/109
(Continued)

(56) References Cited

U.S. PATENT DOCUMENTS

| | | | |
|---|---|---|---|
| 6,424,997 B1 | 7/2002 | Buskirk | |
| 8,751,327 B2 | 6/2014 | Park et al. | |

(Continued)

FOREIGN PATENT DOCUMENTS

| | | | | |
|---|---|---|---|---|
| WO | WO-0184383 A2 * | 11/2001 | ......... | G06Q 30/0601 |
| WO | WO-2008094712 A2 * | 8/2008 | ......... | G06F 16/9535 |
| WO | WO-2016028831 A1 * | 2/2016 | ......... | G06Q 30/0242 |

OTHER PUBLICATIONS

Y. -S. Kim and S. -S. Kim, "Grant Model for Message Detour in Electronic Business System," Future Generation Communication and Networking (FGCN 2007), Jeju, Korea (South), 2007, pp. 68-73 (Year: 2007).*

(Continued)

*Primary Examiner* — Taylor A Elfervig
(74) *Attorney, Agent, or Firm* — Brian R. Short

(57) ABSTRACT

Apparatuses, methods, and systems for a computer-implemented method for electronic message generation are disclosed. One method includes receiving, by a server, an input description from a user, scraping, by the server, characteristics of other electronic messages of the user including at least colors and fonts, generating, by the server, N message sections based on the input description and the scraped characteristics, applying, by the server, colors, fonts, and designs to the generated N message sections, filtering, by the server, the generated N message sections to eliminate message sections that include pre-identified undesired characteristics, displaying, by the server, the filtered electronic message sections to the user, and receiving, by the server, feedback from the user regarding the displayed filtered electronic message sections.

20 Claims, 9 Drawing Sheets

(51) Int. Cl.
H04L 51/02 (2022.01)
H04L 67/50 (2022.01)

(58) Field of Classification Search
USPC .......................................................... 709/206
See application file for complete search history.

(56) References Cited

U.S. PATENT DOCUMENTS

| | | | | |
|---|---|---|---|---|
| 9,892,420 | B2 * | 2/2018 | Sterns | G06Q 30/0242 |
| 10,614,501 | B2 | 4/2020 | Fredrich et al. | |
| 10,728,200 | B2 | 7/2020 | Miller et al. | |
| 11,070,511 | B2 | 7/2021 | O'Brien et al. | |
| 11,144,198 | B2 | 10/2021 | Fredrich et al. | |
| 11,144,980 | B2 | 10/2021 | Fredrich et al. | |
| 11,265,271 | B2 | 3/2022 | Tetrealt et al. | |
| 12,299,718 | B1 * | 5/2025 | Johnson | G06Q 30/0276 |
| 2015/0363796 | A1 * | 12/2015 | Lehman | G06F 16/34 |
| | | | | 705/7.29 |
| 2016/0241502 | A1 | 8/2016 | Georgiou | |
| 2017/0091809 | A1 * | 3/2017 | Liu | G06Q 30/0246 |
| 2018/0027085 | A1 * | 1/2018 | Stanislaw | H04L 67/535 |
| | | | | 709/224 |
| 2019/0043106 | A1 | 2/2019 | Talmor et al. | |
| 2020/0013092 | A1 | 1/2020 | Liu et al. | |
| 2022/0335448 | A1 * | 10/2022 | Garg | H04L 67/535 |
| 2022/0414686 | A1 * | 12/2022 | Lawson | G06Q 30/0201 |
| 2023/0004711 | A1 * | 1/2023 | Bhatnagar | G06F 16/287 |
| 2023/0144617 | A1 * | 5/2023 | Karidi | H04L 51/046 |
| | | | | 709/204 |
| 2024/0144319 | A1 * | 5/2024 | Saidi | G06Q 30/0254 |
| 2024/0428291 | A1 * | 12/2024 | Jain | G06Q 30/0251 |

OTHER PUBLICATIONS

P. He, X. Wen and W. Zheng, "A Novel Method for Filtering Group Sending Short Message Spam," 2008 International Conference on Convergence and Hybrid Information Technology, Daejeon, Korea (South), 2008, pp. 60-65 (Year: 2008).*

S. Berger, R. Kjeldsen, C. Narayanaswami, C. Pinhanez, M. Podlaseck and M. Raghunath, "Using Symbiotic Displays to View Sensitive Information in Public," Third IEEE International Conference on Pervasive Computing and Communications, Kauai, HI, USA, 2005, pp. 139-148 (Year: 2005).*

P. Ghavare and P. Ahire, "Big Data Classification of Users Navigation and Behavior Using Web Server Logs," 2018 Fourth International Conference on Computing Communication Control and Automation (ICCUBEA), Pune, India, 2018, pp. 1-6 (Year: 2018).*

* cited by examiner

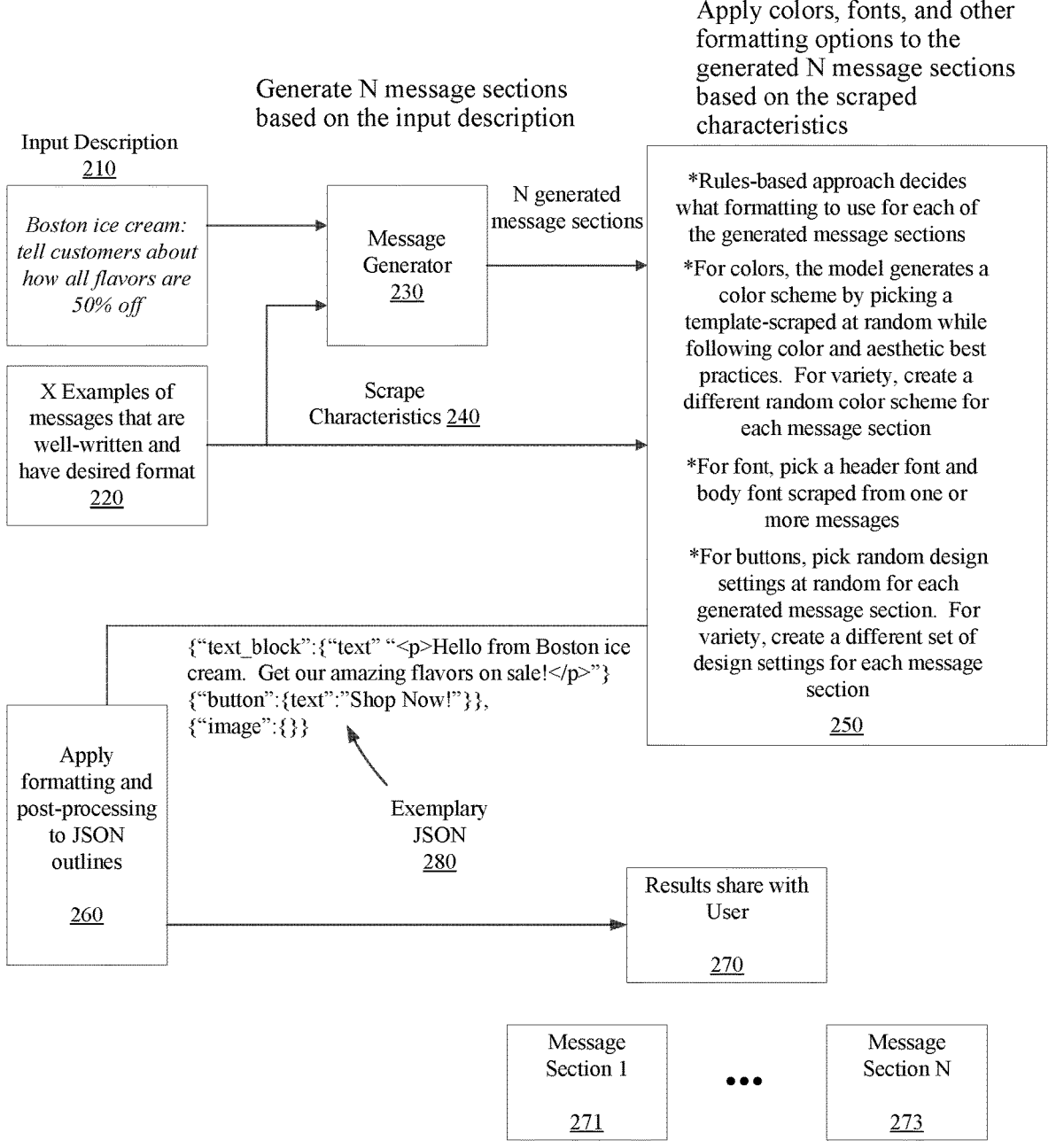

Input Description
210

*Boston ice cream: tell customers about how all flavors are 50% off*

X Examples of messages that are well-written and have desired format
220

Generate N message sections based on the input description

Message Generator
230

Scrape Characteristics 240

N generated message sections

Apply colors, fonts, and other formatting options to the generated N message sections based on the scraped characteristics

*Rules-based approach decides what formatting to use for each of the generated message sections

*For colors, the model generates a color scheme by picking a template-scraped at random while following color and aesthetic best practices. For variety, create a different random color scheme for each message section

*For font, pick a header font and body font scraped from one or more messages

*For buttons, pick random design settings at random for each generated message section. For variety, create a different set of design settings for each message section
250

{"text_block":{"text" "<p>Hello from Boston ice cream. Get our amazing flavors on sale!</p>"}
{"button":{text":"Shop Now!"}},
{"image":{}}

Apply formatting and post-processing to JSON outlines
260

Exemplary JSON
280

Results share with User
270

Message Section 1
271

•••

Message Section N
273

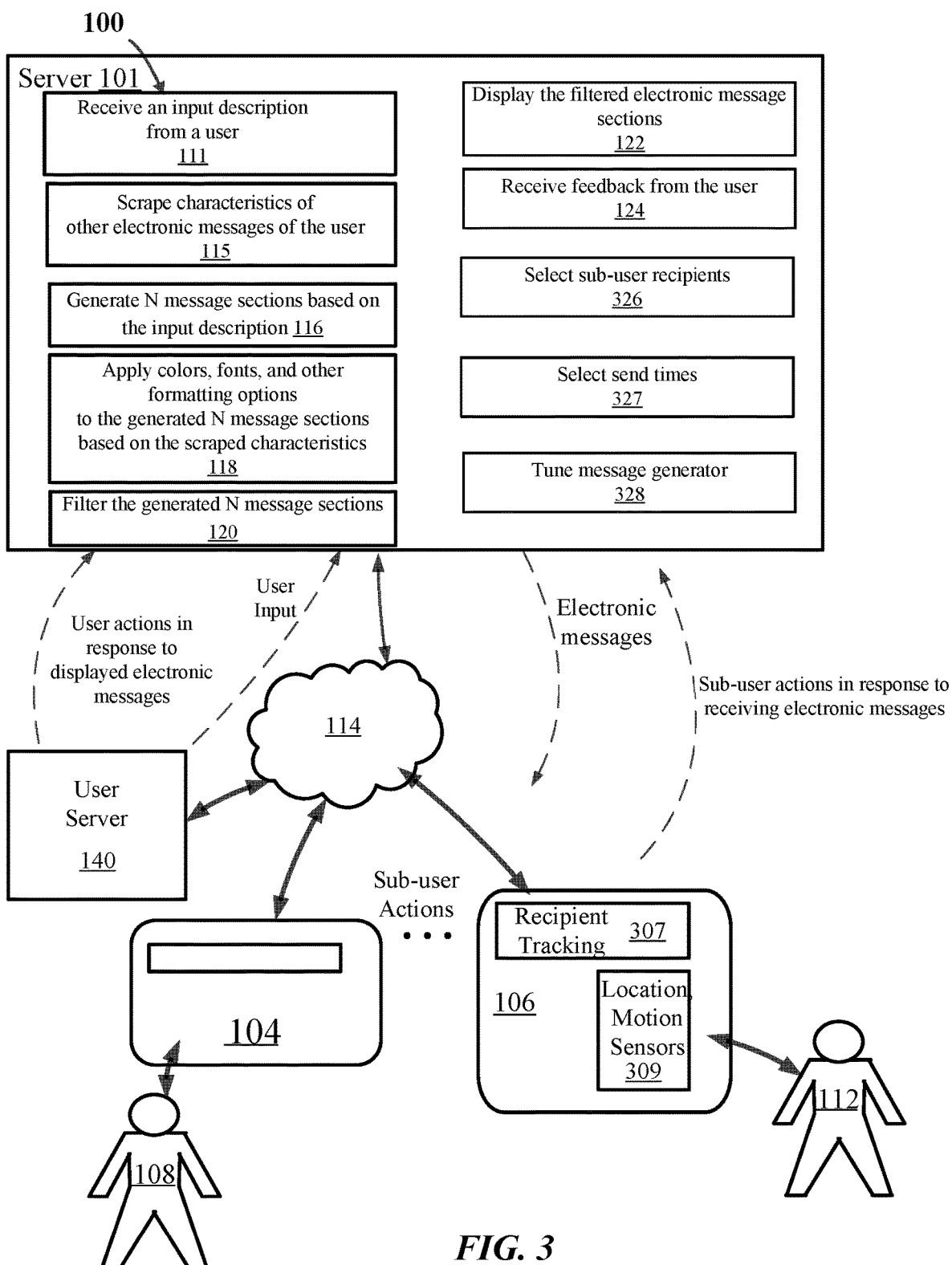

Server 101

Receive an input description
from a user
111

Scrape characteristics of
other electronic messages of the user
115

Generate N message sections based on
the input description 116

Apply colors, fonts, and other
formatting options
to the generated N message sections
based on the scraped characteristics
118

Filter the generated N message sections
120

Display the filtered electronic message
sections
122

Receive feedback from the user
124

Select sub-user recipients
326

Select send times
327

Tune message generator
328

User actions in
response to
displayed electronic
messages

User
Input

Electronic
messages

Sub-user actions in response to
receiving electronic messages

114

User
Server
140

Sub-user
Actions
• • •

104

Recipient
Tracking 307
106

Location
Motion
Sensors
309

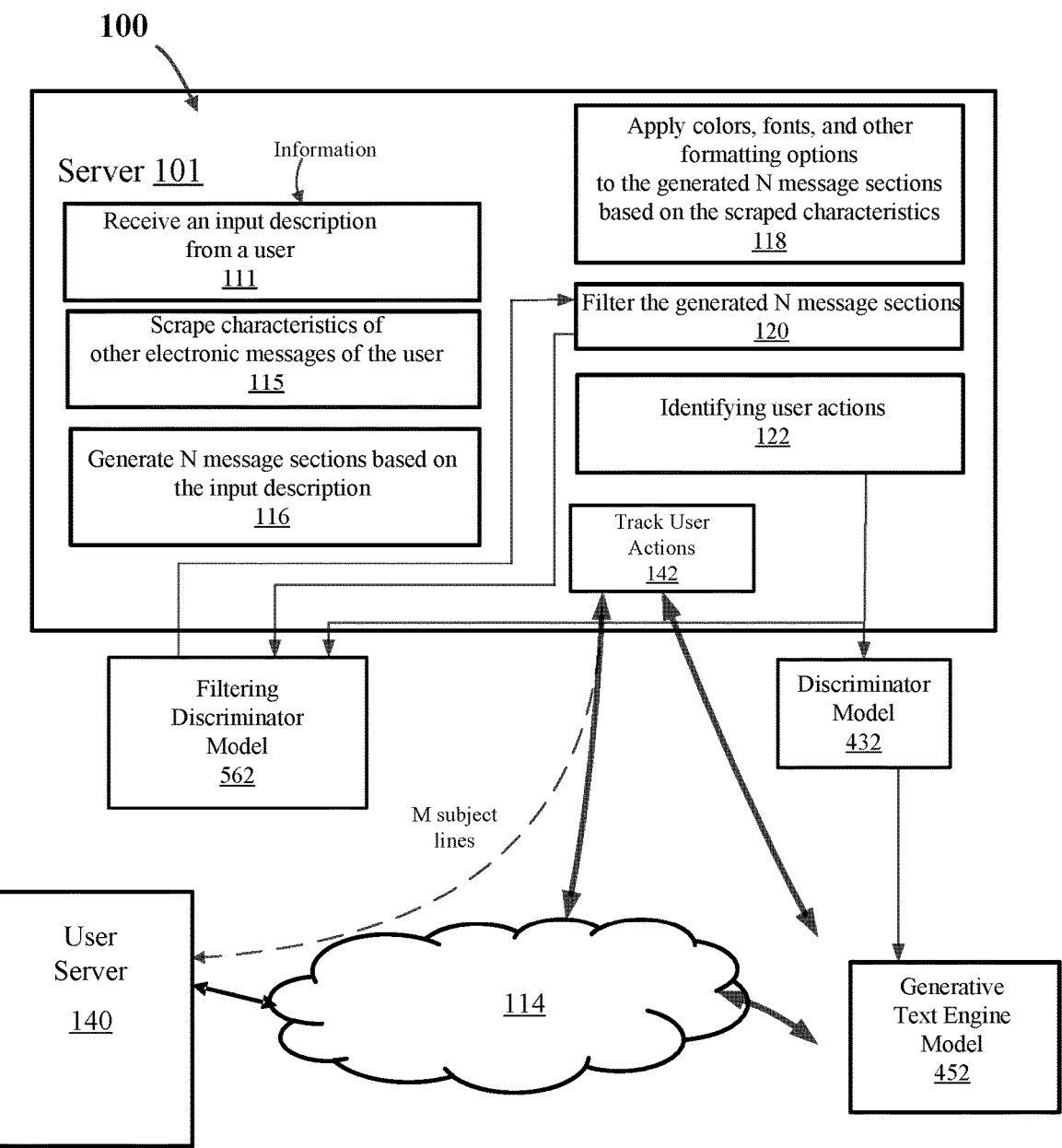

100

Server 101

Information

Receive an input description
from a user
111

Scrape characteristics of
other electronic messages of the user
115

Generate N message sections based on
the input description
116

Apply colors, fonts, and other
formatting options
to the generated N message sections
based on the scraped characteristics
118

Filter the generated N message sections
120

Identifying user actions
122

Track User
Actions
142

Filtering
Discriminator
Model
562

Discriminator
Model
432

User
Server
140

M subject
lines

114

Generative
Text Engine
Model
452

*FIG. 5*

910
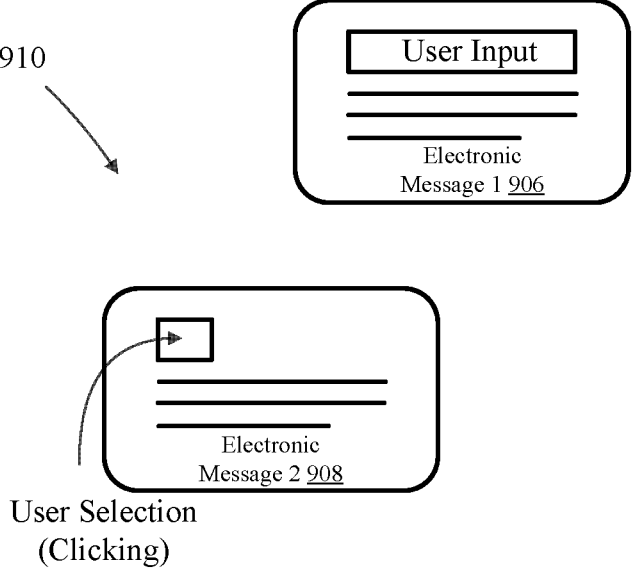
User Selection
(Clicking)
920
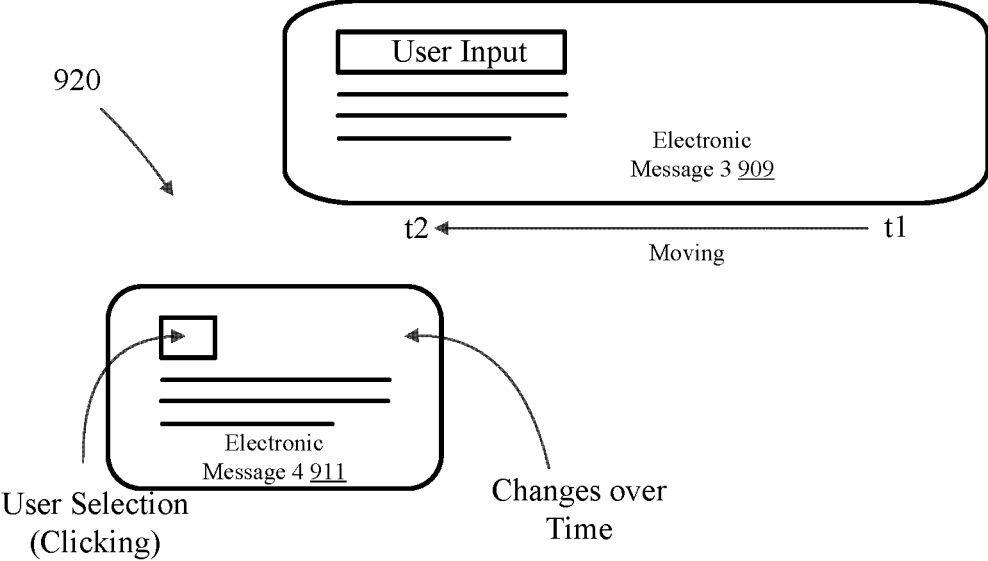
User Selection
(Clicking)
Changes over
Time
*FIG. 9*

ELECTRONIC MESSAGE GENERATION

FIELD OF THE DESCRIBED EMBODIMENTS

The described embodiments relate generally to intelligent electronic messaging. More particularly, the described embodiments relate to systems, methods, and apparatuses for electronic message generation.

BACKGROUND

Users frequently send electronic messages to current and prospective sub-users to solicit a response from sub-user recipients. The content and behavior of the electronic messages can influence the success of the electronic messages.

It is desirable to have methods, apparatuses, and systems for electronic message generation.

SUMMARY

An embodiment includes a computer-implemented method for electronic message generation. The method includes receiving, by a server, an input description from a user, scraping, by the server, characteristics of other electronic messages of the user including at least colors and fonts, generating, by the server, N message sections based on the input description and the scraped characteristics, applying, by the server, colors, fonts, and designs to the generated N message sections, filtering, by the server, the generated N message sections to eliminate message sections that include pre-identified undesired characteristics, displaying, by the server, the filtered electronic message sections to the user, and receiving, by the server, feedback from the user regarding the displayed filtered electronic message sections.

Another embodiment includes an apparatus for electronic message generation. The apparatus includes a user server and a management server electronically connected to the user server through a network. The management server is configured to receive an input description from a user, scrape characteristics of other electronic messages of the user including at least colors and fonts, generate N message sections based on the input description and the scraped characteristics, apply colors, fonts, and designs to the generated N message sections, filter the generated N message sections to eliminate message sections that include pre-identified undesired characteristics, display the filtered electronic message sections to the user, and receive feedback from the user regarding the displayed filtered electronic message sections.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 2 shows a process for generating an electronic message, according to another embodiment.

FIG. 3 shows a system for electronic message generation, according to another embodiment.

FIG. 5 shows a system for electronic message generation, according to another embodiment.

FIG. 9 shows electronic messages, wherein each electronic message includes different content or behavior, according to an embodiment.

DETAILED DESCRIPTION

The embodiments described include methods, apparatuses, and systems for electronic message generation. Improvements in the generation of electronic messages saves a user time in creating the electronic messages. Additionally, improved messages result in better performance (which can be measured by actions of a user and/or by sensed actions of recipients of the generated electronic messages) of the electronic messages. For at least some other embodiments, the electronic messages are generated to be sent in response to some action, such as, an abandoned shopping cart notification, a new subscriber welcome, and/or a one-time message send. At least some embodiments include tuning or adjusting parameters of the electronic messages including at least one of adjusting the generation of the text of the electronic messages, adjusting send times of the electronic messages, adjusting a list of recipients that receive the electronic messages, and/or adjusting a display (such as motion of the display). For an embodiment, the parameters of the electronic messages are adjusted based on sensing an action of recipients (sub-users) of the electronic messages. For an embodiment, the parameters of the electronic messages are adjusted based on sensing an action of a user of the electronic messages.

The described embodiments solve practical problems associated with automatically generating by a server or computing apparatus electronic messages that are likely to solicit a response from recipients (sub-users) of the electronic messages. The electronic messages can include information to be conveyed to sub-users (recipients). The information can be related to anything, such as safety alerts (for example, to natural disasters, or criminal activity), wildfires, political events, etc. Further, the described embodiments further solve practical problems associated with automatically identifying messages and characteristics (including a behavior) of messages that are more or less likely to solicit the response from the recipients (sub-users). Further, the described embodiments further solve practical problems associated with tuning the generation and other characteristics of the electronic messages based on preferences and actions of users who input a description for the electronic messages and based on tracking and monitoring the actions of recipients (sub-users) of the electronic messages. The different electronic messages may include different content and/or behavior. For an embodiment, the behavior can include the behavior of the display of the different electronic messages being different. For example, the display of different electronic messages may include motion of the display of the electronic messages. Accordingly, based on the sensed behavior of recipients of the electronic messages, the display may selectively vary.

Figure 1:
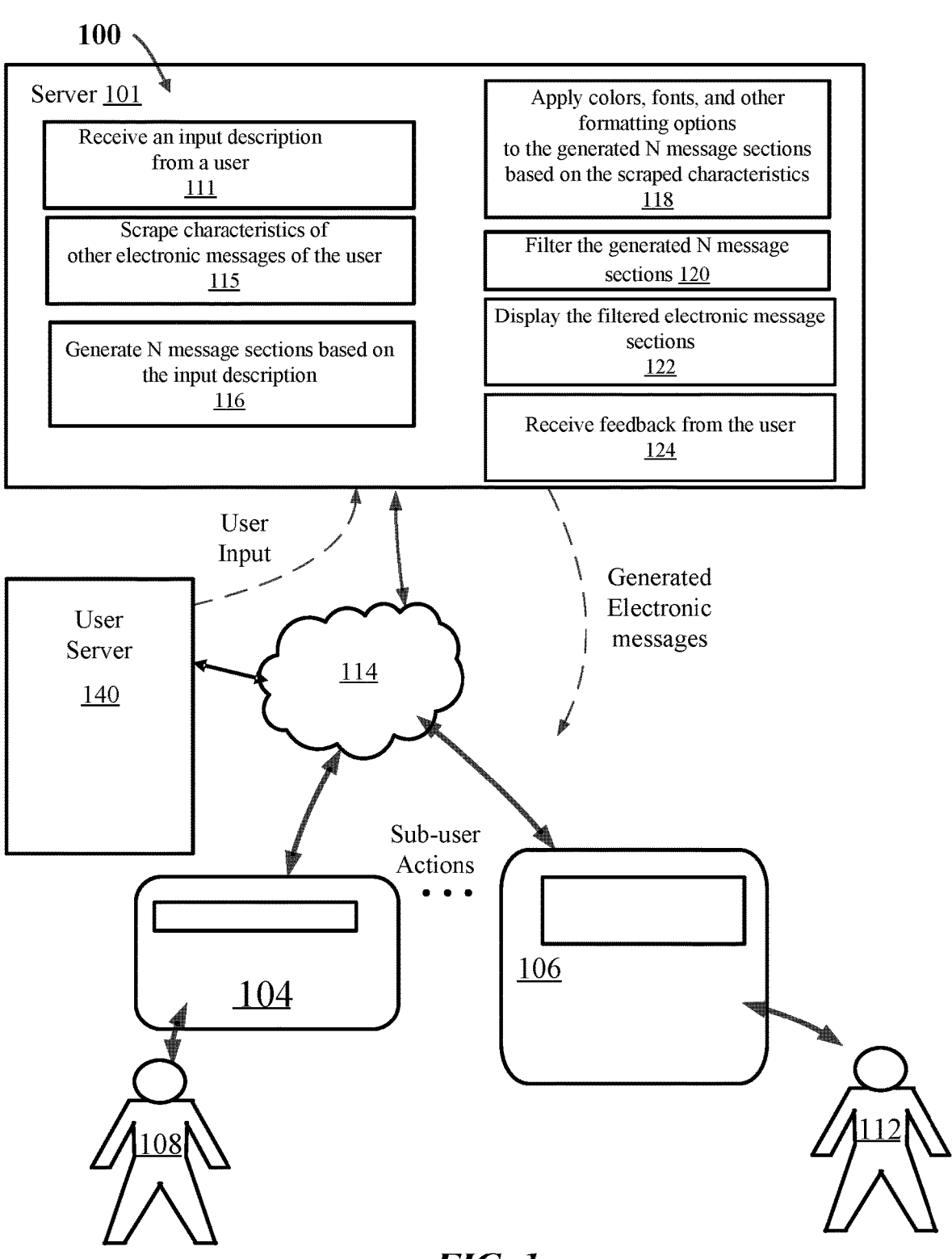
FIG. 1 shows a system for electronic message generation, according to an embodiment.

FIG. 1 shows a system for electronic message generation, according to an embodiment. The system 100 includes a server 101 that is connected through an electronic network 114 to at least a user server 140 of a user. For an embodiment, the user server 140 manages a website of the user. It is to be understood that the term "user" is being used liberally. That is, the user may include any type of business owner. For example, a user can include, for example, a teacher, a doctor, a restaurant owner, etc. Further, it is to be understood that at least some embodiments for generating electronic messages are implemented at the server 101 which is accessed by the user on a client side of the server 101. Specifically, for an embodiment, generating electronic messages is performed by a UI (user interface) of the server 101. For an embodiment, the user provides control to the server 101 through the user server 140.

For an embodiment, the server 101 receives 111 from the user server 140 an input description from the user. For an embodiment, the input description includes a text input. For an embodiment, the text input is limited to a set number of characters. However, for at least some other embodiments, the input description includes more than text. For embodiment, the input description includes an email. For example, for an embodiment, the input description includes images, such as, an image of a product. For an embodiment, input description includes an image of an email. For an embodiment, the input description further includes user preferences, such as, color schemes, brand voice, fonts, etc.

For an embodiment, the server 101 further operates to scrape (115) characteristics of other electronic messages of the user including at least colors and fonts. For an embodiment, the scraping includes scraping branding characteristics of other electronic messages of the user including at least brand colors and brand fonts. For an embodiment, scraping, by the server, characteristics of other electronic messages of the user comprises scraping code of a current message of the user, scraping code of other messages of the users, and scraping code of one or more websites of the user. For an embodiment, the scraping includes code that identifies characteristics of text and images of the messages of the user, and/or a website of the user.

For an embodiment, the scraping provides a determination of preferences of the user. For example, scraping may be used to determine the color preferences of the user. An embodiment includes determining the N (for example, 6) colors that are the most important to the user, and therefore, important to a brand of the user. For an embodiment, the determination is based on scraping code of a current message of the user. For an embodiment, the determination is based on scraping code of other messages of the users. For an embodiment, the determination is based on scraping code of one or more websites of the user. For an embodiment, the color determination is directed to text or wording of the user. An embodiment includes making the determination by counting letters of the messages or websites allocated to each color. An embodiment includes making the determination by counting words of the messages or websites allocated to each color. An embodiment includes determining the top X (such as, two) common background colors. For an embodiment, this includes scraping the code of the messages or websites of the user to determine the percentage of the background that is allocated to each color. An embodiment includes determining the top selectable button colors. For an embodiment, this includes scraping the code of the messages or websites of the user to determine the percentage of the selectable buttons that are allocated to each color.

For an embodiment, the server 101 further operates to generate (116) N message sections based on the input description and the scraped branding characteristics. For an embodiment, this includes a text generation model which generates one or more generated electronic messages. The text generation model may include an LLM (large language mode) that receives the input description and the branding characteristics. The N messages can be provided to the user which the user can then select one or more of the N messages for generation of the electronic message. As described, for an embodiment the message section generator includes an LLM (large language model) that receives a textual input. However, as described, the input description received from the user is not limited to text. The input description may include images as well. For an embodiment, the input description includes one or more images, and the message section generator includes a MMLLM (multi-model large language model). For an embodiment, the user feedback and sensed sub-user actions are used for training the MMLLM.

Further, for an embodiment, the text generation model is directed to follow marketing best practices like being concise, friendly, having a clear call to action, etc. For an embodiment, sensed sub-user (recipient) actions and sensed user actions are tracked and used to train the text generation model. Further, examples of well-written messages are used to help guide (train) the text generation model to generate the N message sections that look better or are more effective.

For an embodiment, the server 101 further operates to apply (118) colors, fonts, and applying, by the server, colors, fonts, and other formatting options to the generated N message sections based on the scraped characteristics. The formatting options may include a selectable button width, button border styles, a button border width, padding, a font line spacing, and/or a font size. For an embodiment, the formatting options include any setting that can be applied to control the appearance of a piece of text or other element of the message.

For an embodiment, the server 101 further operates to filter (120) the generated N message sections to eliminate message sections that include pre-identified undesired characteristics. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section.

For an embodiment, the server 101 further operates to display the filtered electronic message sections to the user.

For an embodiment, the server 101 further operates to receive (124) feedback from the user regarding the displayed filtered electronic message sections. The feedback may include a selection of one or more of the N message sections. For an embodiment, the feedback may be user dependent. That is, different users may have different selection types. For an embodiment, the different selection types are feedback to the text generation model. That is, for an embodiment, the text generation by the text generation model is different for each user as defined by sensed or determined actions by each of the users.

For an embodiment, the server 101 further operates to electronically send the set of generated electronic messages to computing devices 104, 106 of sub-users 108, 112. For an embodiment, the sub-users 108, 112 have visited a website of the user.

FIG. 2 shows a process for generating an electronic message, according to another embodiment. FIG. 2 shows an example of an input description 210 to a message generator 230. Further, X examples of messages 220 that the user considers to be well-written and of a desired format can be provided to the message generator 230.

For an embodiment, the input description is a message as well, and for an embodiment, the server scrapes 240 the message of the input description, other messages (such as example messages 220), other identified messages of the user, and/or a website of the user. The scraping 240 may include identifying the majority of colors and fonts of the messages or websites. That is, code that generates the messages or the websites is scraped to identify the user of colors and/or fonts included within the messages or websites. Clearly, other features in addition to colors and fonts can be scraped.

For an embodiment, the message generator 230 generates N message sections. An embodiment then includes applying 250, by the server, colors, fonts, and other formatting options to the generated N message sections based on the scraped characteristics. The formatting can include button designs. That is, for an embodiment, the electronic messages include a selectable button when received by the recipient (sub-users). Different button designs and button locations are more or less likely to be selected. For an embodiment, the different button designs and button locations are part of the different content and behavior of the different electronic messages.

For an embodiment, the N message sections include JSON (JavaScript Object Notation) outlines. For an embodiment, formatting and post-processing 260 are applied to the JSON outlines. JSON is an open standard file format and data interchange format that uses human-readable text to store and transmit data objects consisting of attribute-value pairs and arrays. It is a commonly used data format with diverse uses in electronic data interchange, including that of web applications with servers.

For an embodiment, the filtered electronic message sections 271-273 are displayed (results shared 270) to the user. For an embodiment, the user may then select one or more of the filtered electronic message sections 271-273 to form one or more electronic messages to be delivered to the sub-users. As described, when the sub-users visit the website of the user, code is uploaded to the browser of the sub-user, thereby allowing the server to track and monitor the actions of the sub-users to allow for the identification of successful electronic messages, and accordingly, successful message sections.

FIG. 3 shows a system for electronic message generation, according to another embodiment. An embodiment further includes adaptively selecting 322 sub-users (such as, sub-users 108, 112 of computing devices 104, 106) to receive the generated electronic messages. An embodiment further includes adaptively selecting a timing of electronically sending the generated electronic messages. An embodiment further includes tuning the generation of the electronic messages. For an embodiment, the tuning is based on actions of the user, and/or actions of recipients (sub-users) of the electronic messages.

Selecting Sub-Users to Receive Generated Electronic Messages

As described, at least some embodiments include selecting (326) which sub-users are to receive the generated electronic messages. For an embodiment, the sub-users are selected based on the type of computing device associated with the sub-user. Further, as described, for an embodiment, sub-users are adaptively selected to receive the generated electronic messages based on monitoring, sensing, or tracking of response of recipients (sub-users) of the electronic messages. That is, some recipients (sub-users) are more likely to perform an action based on receiving the generated electronic messages. For an embodiment, the sensing of the actions of the recipients is used to adaptively select which of the generated electronic messages to electronically send to each recipient. An embodiment includes adaptively selecting a list of sub-users for receiving the generated electronic messages based on sensed action of sub-users that receive the generated electronic messages. Past actions of each of the sub-users can be used to adapt the list of sub-users to receive future generated electronic messages.

For an embodiment fine tuning the generated electronic messages includes adaptively adjusting the recipients of the generated electronic messages based on the sensing the actions of the recipients of the generated electronic messages. That is, different recipients can be selected for different of the generated electronic messages. For each of the generated electronic messages a list of sub-user recipients for each can be adaptively adjusted based on the sensed actions of the recipient sub-users. For an embodiment, fine tuning the generated electronic messages includes adaptively adjusting a distribution of generated electronic messages amongst the sub-users.

Selecting a Timing of Electronically Sending the Generated Electronic Messages

As described, at least some embodiments include selecting 327 a send time of one or more of the generated electronic messages. For an embodiment, multiple of the generated electronic messages can be electronically sent to sub-users simultaneously. For example, a set of sub-users may be determined to be likely to respond to a particular type of electronic message. For an embodiment, the electronic messages may be sent to different sub-users at different times. For example, the sensing of action of recipients (sub-users) of the electronic messages can be used to adaptively adjust the timing of the sending of future electronic messages. For example, some sub-users may be adaptively determined to have performed an action based on receiving the electronic message versus some other sub-users. Accordingly, the timing of the electronic messages being sent may be adaptively adjusted based on the sensing of the actions of the recipient (sub-users) of the electronic messages. For an embodiment, a first electronic message may be sent at a first time, and a second electronic message may be sent at a later time. The sequence of the timing of the sending of the first electronic messages and the second electronic messages may be used to determine which of the first electronic messages or the second electronic messages are more effective for each sub-user.

Tuning the Generation of the Electronic Messages

As described, at least some embodiments include sensing sub-user action based on receiving the generated electronic messages. The sensing may include sensing of any action performed by the recipient (sub-user) based on receiving the generated electronic messages.

At least some embodiments further include adjusting, by the server, the set of generated electronic messages including tuning 328 the generated electronic messages based on sensing actions of the recipients of the generated electronic messages. For an embodiment, different versions of the generated electronic messages are sent to different sub-user recipients. Based on the sensed actions of the sub-user recipients, certain versions are favored over other versions. That is, the versions that caused an action to be performed by the recipient sub-user can be categorized as more effective in causing action by the recipient. The different versions of the generated electronic messages can be determined by the text of the generated electronic messages based on the text.

Over time, the actions of the recipients are learned, and what variation of the different types of electronic messages work the best is learned. For an embodiment, this can further include tuning to identify the importance of the text of the messages, how to condense the text, and how to draft the generated electronic messages.

As previously described, at least some embodiments include selecting a send time of one or more of the generated electronic messages. For an embodiment, multiple of the generated electronic messages can be electronically sent to sub-users simultaneously. For example, a set of sub-users may be determined to be likely to respond to a particular type of electronic message. For an embodiment, the electronic messages may be sent to different sub-users at different times. For example, the sensing of action of recipients (sub-users) of the electronic messages can be used to adaptively adjust the timing of the sending of future electronic messages. For example, some sub-users may be adaptively determined to have performed an action based on receiving the electronic message than some other sub-users. Accordingly, the timing of the electronic messages being sent may be adaptively adjusted based on the sensing of the actions of the recipient (sub-users) of the electronic messages. For an embodiment, a first electronic message may be sent at a first time, and a second electronic message may be sent at a later time.

At least some embodiments include condensing details of at least a word string or phrase of the prioritized text. For an embodiment, condensing the details include identifying at least one word string or phrase, an introductory catch phrase, key details of the promotion (percent off, offer deadline, promo code, product details), a single call to action phrase (ex. "Buy now"). For an embodiment, condensing comprises filtering/eliminating text of the at least text that is not associated with the identified word string or phrase. For an embodiment, the identified word string or phase is identified from a subject line of the first channel electronic message. For an embodiment, filtering the at least text includes filtering text of the machine-encoded text that is not similar to the text of the subject line. For an embodiment, higher-priority text is kept, and lower-priority text is filtered out. As described, the priority of the text can be determined by a similarity of the text with the subject line. For an embodiment, the priority is additionally or alternatively based on a spatial location of the text within the first channel electronic message. For an embodiment, the priority is additionally or alternatively based on size of the text within the first channel electronic message. For an embodiment, the filtering is based on prioritization of the text including identifying key parts of the text of the first channel electronic message. Such parts can be extracted, such as, an introduction, call to action phrase ("click here", "shop t shirts"), and/or 1-3 supporting details ("sale ends friday", "10% off shirts").

An embodiment further includes managing, by the server, the set of generated electronic messages includes fine tuning the generated electronic messages based on sensing actions of a user in response to the generated electronic messages. As previously described, for an embodiment, the server 101 that is connected through an electronic network 114 to at least a user server 140 of the user. For an embodiment, the user server 140 manages a website of the user. Further, as described, the server 101 receives 111 from the user server 140 the first channel electronic message, wherein the first channel electronic message includes a formatted message that includes at least text. For an embodiment, the user can review the electronic messages before the electronic messages are electronically sent to the sub-users. During this review, the user can edit or modify the electronic messages before being sent to the sub-users. These actions during the review of the electronic messages can be used to adaptively adjust future electronic messages based on monitoring the actions of the user.

Tracking Sub-User (Electronic Message Recipient) Actions

As previously described, for an embodiment, the server 101 further operates to electronically send 122 the set of generated electronic messages to computing devices 104, 106 of sub-users 108, 112. For an embodiment, the computing devices 104, 106 of the sub-users 108, 112 are electronically connected to the server 101 and the user server 140 through, for example, the network 114. For an embodiment, the server 101 tracks sub-user actions based on the messages (first channel messages and/or me messages) displayed to one or more sub-users 108, 112 of the user (which may be a merchant) of the user server 140.

For an embodiment, when the sub-user loads a webpage of the user, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored.

For an embodiment, the user-tracking code can utilize sensors on the computing device of the sub-user to track actions of the computing device. For example, the computing device may be a mobile device that includes motion and location sensors that can identify actions of the sub-user that can be correlated with the sub-user having received a displayed form. Further, actions of multiple sub-users can be sensed to determine correlations between different sub-users.

For an embodiment, the tracking of the sub-users includes tracking online activity and action by the sub-users. For an embodiment, a sub-user device (such as, devices 104, 106) alone or in conjunction with the server 101, or the user server 140 operates to sense the sub-user action data. For an embodiment, the sensed and tracked sub-user action data includes the sub-user computing device electronically sensing a sub-user performing an action or activity in response to the displaying of the electronic messages to the sub-user. For an embodiment, sensing the sub-user performing an action includes sensing that the sub-user is selecting or "clicking" a link included within the generated electronic message(s).

While the described embodiments are directed towards sensing sub-user action data, it is to be understood that at least some other embodiments can additionally or alternatively include the sensing of other types of data as well. For an embodiment, the sensed data can include user server data, such as, web traffic and purchases among message recipients. That is, the sensed sub-user action data could be replaced with, for example, data of daily total or new visitors on the user website.

The sub-user action data may be tracked (counted) over various possible time periods (such as, by the second, minute, hour, day, week, or month) and may include one or more of sub-users (108, 112) being active on the website of the user server 140, a sent email bouncing, a sub-user canceled order, a sub-user starting a checkout, a sub-user clicking (selecting) an email, a sub-user opening email, a sub-user placing order, a sub-user receiving email, a sub-user refunding an order, a sub-user unsubscribing, a sub-user viewing a product, a sub-user adding to a list (a list in the marketing automation platform of the server 101 account), and/or a sub-user adding an item to their cart.

It is to be understood, however, that there are very few limitations on what event types (sub-user actions) can be published (provided) to an automation platform of the server 101. Website managers (such as website manager of the user server 140) can implement their own events (sensed sub-user actions) that make sense for their business and simply send those events over to the automation platform of the server 101.

Further, as will be described, implementations of computing devices 104, 106 that include mobile devices that include recipient tracking sensors 307 and location/motion sensors 309 and can additionally or alternatively include additional types of sensed sub-user actions. Such sensed sub-user action can include sensing a physical sub-user visit and/or purchase. Further, such sensed sub-user action can include sensing a virtual sub-user visit and/or purchase online. That is, the sensing of the sub-user action can include sensing the sub-user visiting a physical location of the user, and/or the sub-user purchasing a product or service of the user at a physical store location of the user. Further, the sensed sub-user actions can include combinations or sequences of sub-user actions. For an embodiment, sensed sub-user actions are weighted based on the sensed sub-user actions. For an embodiment, only sensed sub-user actions having a weight, or a combination of weights that exceed a sub-user action threshold are considered a sub-user action for the purposes of detecting sub-user actions.

For an embodiment, the location monitoring of the mobile device of the sub-user is used to identify business locations visited by the recipient after receiving the electronic message(s) of the marketing message. Different businesses can be rated, wherein particular businesses yield a higher sub-user action score, and other particular businesses yield a lower engagement score. The sub-user action score of each business can be adaptively adjusted based on the electronic marketing message of the user and can be adjusted based on other businesses visited by the recipient. For an embodiment, patterns of location visits by the recipient can be used to influence the level of sub-user action.

For an embodiment, motion of the recipient is tracked by location and motion sensors 309 and can be used to influence the level of sub-user action. Certain actions (motions) of the recipient may indicate different levels of sub-user action. For an embodiment, the computing devices 104, 106 may include a mobile phone, a smart watch, or a headset. Motion of the recipient can include tracking hand motions, direction of eyesight, and/or orientations of the recipient. Accordingly, whether the recipient is in a physical location of a product of the user can be determined. Further, how long the recipient holds or looks at a specific product of the user can be determined. Further, whether the recipient interacts with another recipient can be determined. All the sensed/tracked locations and motions of the sub-user can be included within a score of the sub-user action. For example, visiting a restaurant after receiving a message is a very possible use case since this is an in-person sub-user action. Again, a score that exceeds a score threshold can be deemed a sub-user action. The actions and locations of the sub-user can be tracked 307 allowing patterns in the sub-user behavior to be determined. As described, sequences of behaviors by the sub-user can be ranked for determining a score which is used for determining whether a sub-user action has occurred.

Further, for an embodiment, different businesses physically visited can be rated, wherein particular businesses yield a higher success score and other particular businesses yield a lower success score. The success score of each business can be adaptively adjusted based on marketing messages and can be adjusted based on other businesses visited by the sub-user. For an embodiment, patterns of location visits by the sub-user can be used to influence the level of success. That is, for example, visiting a location of a business can be rated higher or lower based on a previous business visited by the sub-user.

As previously described, the sub-user tracking can include monitoring of web browsing of the sub-user. Online action and activity of the sub-user can influence the success score. Links accessed by the sub-user can be tracked. Websites visited by the sub-user can be tracked. Online purchases of the sub-user can be tracked. Each of the online web browsing of the sub-user can influence the success score of the sub-user actions.

For an embodiment, eye tracking of a sub-user can be sensed and used to see how long a sub-user observes an electronic message (how engaging the message is), or, how long the sub-user has the electronic message open on their screen. These observed actions can further be used to rank the success of generated electronic messages sent to sub-user(s).

For an embodiment, relationships between different sub-users are determined. For example, web tracking can determine online relationships between sub-users. Further, for an embodiment, a real physical relationship between sub-users can be established by tracking the locations of the different sub-users. Two sub-users may be identified as friends or associates or living together based on location tracking. Further, commonalities of recipients can be determined by identifying common locations, or common types of locations between the different sub-users. The influence one sub-user has on another sub-user can be measured and the influence can add or subtract from the success score.

For an embodiment, a level of sub-user action can be adaptively adjusted for each sub-user based on actions of an associated sub-user. An action by a related or common type of sub-user can influence how much an action by a sub-user influences the engagement determination or influences a success determination.

As previously described, the success determination of the described sub-user actions can be scored, and a score exceeding a score threshold can qualify as a sub-user action which is tracked.

The sub-user may then act upon the receiving and displaying of the electronic message(s). For an embodiment, the sub-user actions based on the displayed electronic message are monitored. For an embodiment, the sub-user actions are stored in the action database. For an embodiment, a second discriminator model of the server 101 generates a quality rating for each of the displayed electronic messages based on the previously described different sub-user actions. For an embodiment, the quality rating of each of the electronic messages is feedback to the server 101 to additionally influence the generation of electronic messages.

Tracking User Actions

As previously described for an embodiment, the user can review the electronic messages before the electronic messages are electronically sent to the sub-users. During this review, the user can edit or modify the electronic messages before being sent to the sub-users. These actions during the review of the electronic messages can be used to adaptively adjust future electronic messages based on monitoring the actions of the user. For an embodiment, the server 101 additionally tracks user actions based on the electronic messages displayed to the user of the user server 140. For at least some embodiments, the tracking of the user actions includes tracking the user selecting a displayed electronic message of a plurality of displayed electronic messages. Clicking the displayed electronic message indicates an interest by the user in the selected electronic message and indicates a level of value of the selected electronic message. For an embodiment, tracking of the user includes tracking the user modifying the electronic message, and submitting a final revised electronic message. For an embodiment, tracking of the user includes identifying differences between the electronic messages displayed to the user and the electronic message(s) sent by the user to sub-users of the user. Modifying a selected electronic message provides a level of value of the modified and submitted electronic message. For an embodiment, tracking of the user includes tracking future user copy (user copy is content written to promote or sell a product or service or to persuade readers to take a certain action. Marketing (user) copy is a useful tool that educates sub-users, provides resources and details contact information to help businesses increase awareness of their products and services) to identify if any of the electronic messages were used as tonal or stylistic inspiration in future communications. For an embodiment, tracking of the user actions includes tracking the user interacting with the electronic message generation system to allow more creative copy from users regardless of whether specific verbatim phrases are used in future communications. For an embodiment, tracking the actions of the user includes tracking messages sent by the user in any channel supported by the system including, for example, email, SMS, send push notifications, and others.

Figure 4:
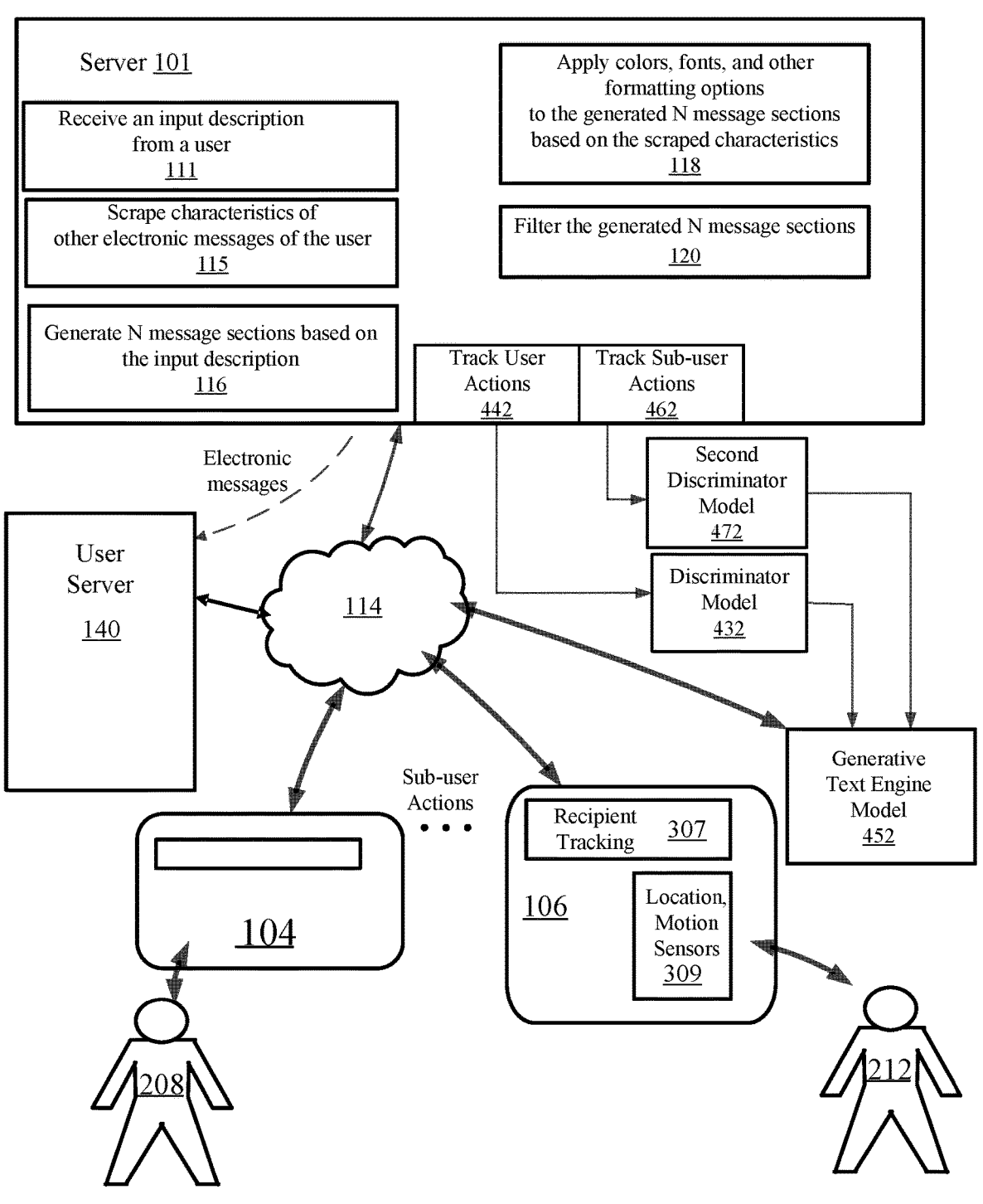
FIG. 4 shows a system for electronic message generation, according to another embodiment.

FIG. 4 shows a system for electronic message generation, according to another embodiment. For an embodiment, a discriminator model 432 operates to assign a quality rating for each of the electronic messages based on the identified (tracked) user actions 442. For an embodiment, the discriminator model 432 is provided with examples of electronic messages and whether or not a user clicked on, engaged with, or is inspired from (such as writing copy that is similar to), or performed some other action showing interest in a generated electronic message. This allows the discriminator model 432 to predict whether or not a user will find an electronic message that the generator comes up with to be of high-quality and based on the discriminator's predicted probability that the user will approve the electronic message. For an embodiment, the X electronic messages with the highest X "quality ratings" can be chosen and then those X electronic messages can be shown to the user since these electronic messages are the "best" of the group of electronic messages. For an embodiment, the worst performing electronic messages can also be used by the discriminator model 432.

For an embodiment, different tracked user actions suggest a different level of quality of each of the electronic messages. Accordingly, different specific actions, and/or combinations of actions performed by the user on the displayed electronic messages can yield a different ranking of the electronic messages.

For an embodiment, the discriminator model 432 is trained on historically tracked user actions on previously generated electronic messages, wherein the historical users actions include selection, editing, and actual use of an electronic message. For an embodiment, the trained historical model is equipped to assign a quality rating to new, previously unseen electronic messages after the electronic messages have been generated, allowing selection of the predicted top-performing electronic messages to display to the user.

For an embodiment, a second discriminator model 472 assigns a second quality rating for each of the electronic messages displayed to the one or more recipients (sub-users) based on the tracked sub-user actions 462. For an embodiment, the rankings of the sub-user actions influence the quality rating of each of the electronic messages. For an embodiment, the second discriminator model 472 is trained on historically tracked recipient (sub-user) actions on previously generated electronic messages, including opening of and clicks in the electronic messages. With this training the model assigns a quality rating to new, previously unseen electronic messages after the electronic messages have been generated, allowing selection of the predicted top-performing electronic messages to display to the user.

At least some embodiments further include continuously updating the generative text engine model 452 based on continuously generated second quality ratings as determined by the second discriminator model 472.

For an embodiment, the discriminator model 432 and the second discriminator model 472 both simultaneously provide quality ratings of electronic messages for the generative text engine model 452. For an embodiment, discriminator models 432, 472 can be used together to create a conclusive quality rating by for example creating a weighted sum of the outputs of the two models. For an embodiment, one of the discriminator models has a greater influence on the quality rating than the other of the discriminator models. For example, when a quality rating of one of the discriminator models suggests a very high quality (greater than a predetermined threshold) then that discriminator model provides the dominant quality rating. For example, the actions of the user may indicate one electronic message to have a high quality. However, the recipient (sub-user) action may indicate that one other electronic message is substantially better (greater than the predetermined threshold). For an embodiment, the recipient (sub-user) actions provide a better electronic message quality indication than the user actions. Accordingly, in this case, the second discriminator model 472 has a greater influence on the quality of the electronic message than the discriminator model 432.

For an embodiment, the discriminator 432 and the second discriminator 472 are combined to form a single discriminator model that is trained using data consisting of both user and recipient (sub-user) actions.

FIG. 5 shows a system for electronic message generation, according to another embodiment. As previously described, for an embodiment, the server 101 operates to filter the generated N message sections to eliminate message sections that include pre-identified undesired characteristics. As shown, the embodiment of FIG. 5 further includes a filtering discriminator model 562 which can operate to facilitate the filtering of the generated N message sections. For an embodiment, the previously described identified user actions are used to improve (train) the operation of filtering discriminator model 562. For an embodiment, the training adds style or branding of the user per feedback as to electronic messages that have higher scoring or ranking due to user actions, such as, clicks/conversions/etc. For an embodiment, this can be tailored to the user, the type of message, or the recipient (sub-user). For an embodiment, multiple electronic messages can be A/B tested to determine the better performing electronic message. For this embodiment, the previously described identified recipient (sub-user) actions are used to improve (train) the operation of filtering discriminator model 562.

Figure 6:
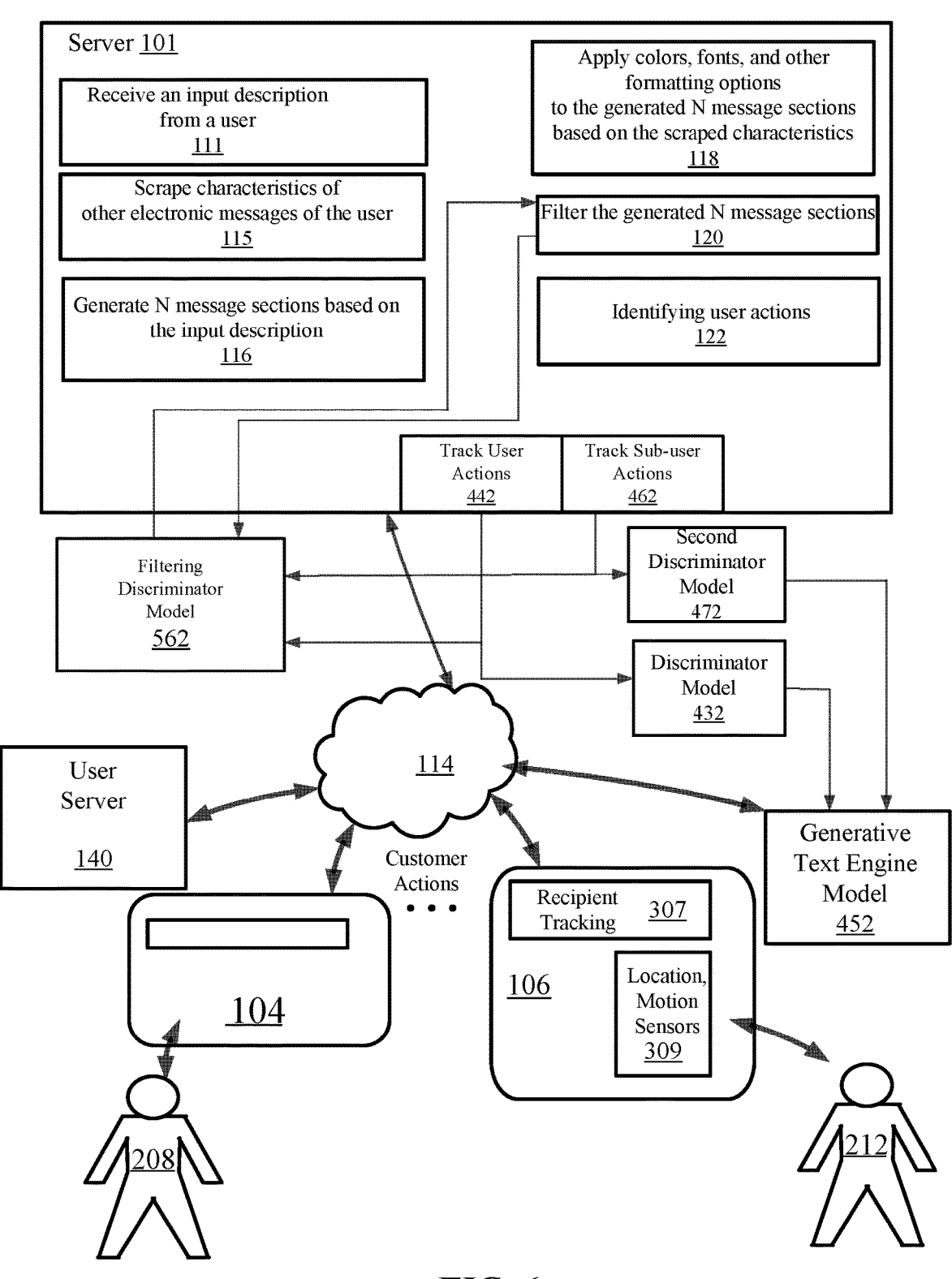
FIG. 6 shows a system for electronic message generation, according to another embodiment.

FIG. 6 shows a system for electronic message generation, according to another embodiment. This embodiment includes the discriminator model 432, the second discriminator model 472, and the filtering discriminator model 562.

Figure 7:
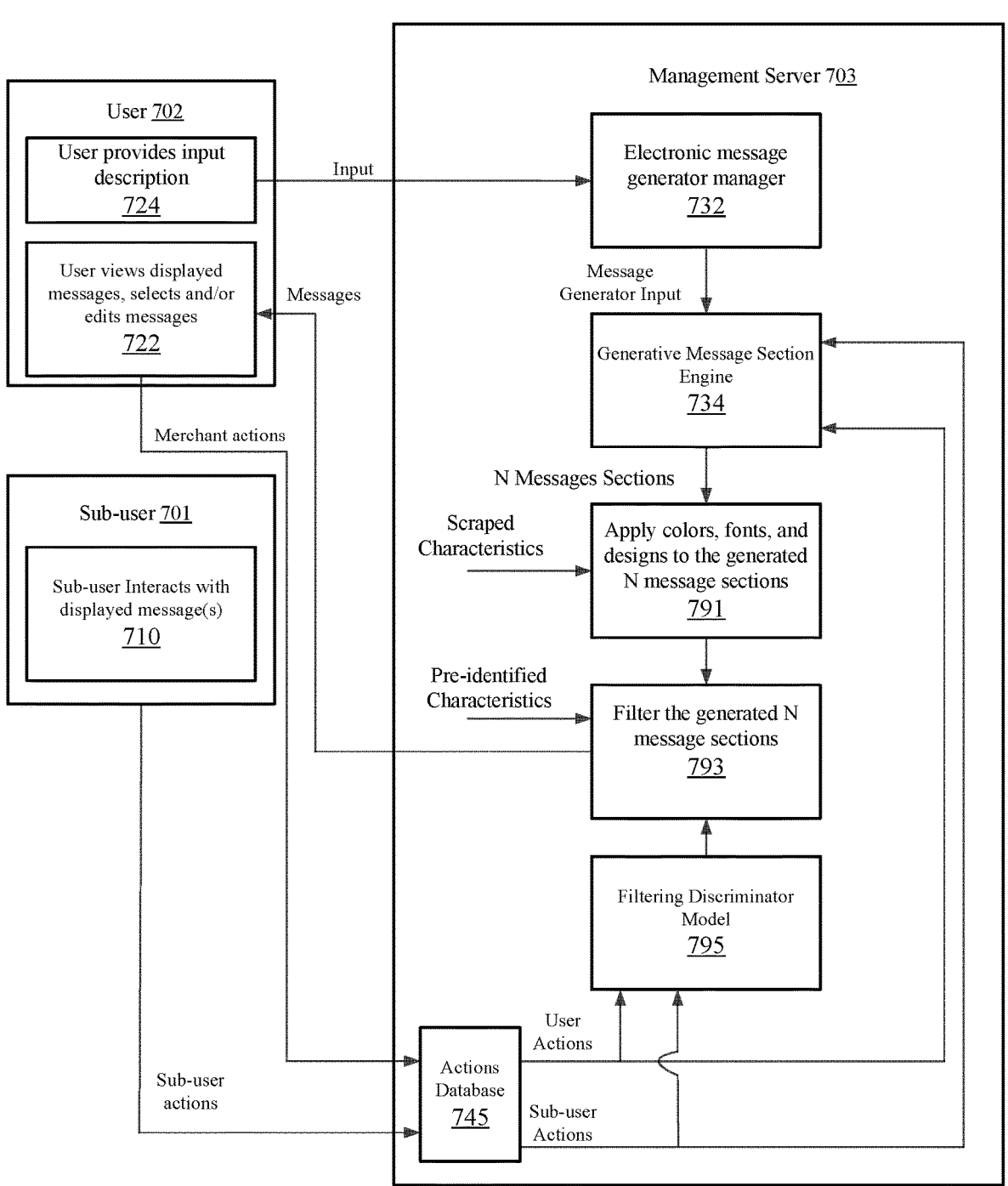
FIG. 7 shows a system for electronic message generation, according to another embodiment.

FIG. 7 shows a system for electronic message generation, according to another embodiment. As shown, for an embodiment, a user a user server 702 may provide an input description 724. The input description 724 may be additionally processed and then received by an electronic message generator manager 732 of a management server 703 for input to a generative text engine 734.

As previously described, for an embodiment, the server (management server 703) is configured to scrape characteristics (such as, branding characteristics) of other electronic messages of the user including at least brand colors and brand fonts. As described, the server may further scrape websites of the user for the characteristics.

For an embodiment, the generative text engine 734 provides textual outputs of the N message sections based on the input description from the user and the scraped characteristics. For an embodiment, the input description provides information about the electronic messages the user would like to generate, including, for example, a short description of the electronic message the user wants to send, and a bit of metadata about an electronic campaign the user wants to launch. This information is fed into the generative text model. For an embodiment, the textual outputs are in the form of the N electronic message sections that can be the basis for electronic messages of a marketing message of the user of the user server 702.

As previously described, for the embodiment, the management server 703 further operates to apply (791) colors, fonts, and designs to the generated N message sections. For an embodiment, this application may be bypassed or eliminated. For an embodiment, this includes applying colors, fonts, and applying, by the server, colors, fonts, and other formatting options to the generated N message sections based on the scraped characteristics. The formatting options may include a selectable button width, button border styles, a button border width, padding, a font line spacing, and/or a font size. For an embodiment, the formatting options include any setting that can be applied to control the appearance of a piece of text or other element of the message.

As previously described, for the embodiment, the management server 703 further operates to filter (793) the generated N message sections to eliminate message sections that include the pre-identified undesired characteristics. For an embodiment, this includes filtering the generated N message sections to eliminate message sections that include pre-identified undesired characteristics. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section.

For an embodiment, after filtering the generated N message sections, the generated messages or messages based on the generated messages are displayed 722 to the user. The user views the displayed messages and can then select or edit the generated and displayed electronic messages. For an embodiment, the monitored user actions are stored in a monitored actions database 745. Different actions by the user provide different levels of interest in the displayed electronic messages, and accordingly, can influence a ranking of the quality of each of the displayed electronic messages. For an embodiment, a discriminator model receives the user actions, ranks the electronic messages (message sections) based on the monitored user actions, and provides quality ranking data of the generated electronic messages back to the generative text engine 734. Accordingly, the electronic messages generated by the generative text engine 734 will improve over time as more generated electronic messages are ranked and the quality of each of the generated electronic messages is feedback to the generative text engine 734.

Additionally, for an embodiment, a sub-user 701 of the user 702 is provided with electronic messages that are based on the electronic messages provided to the user 702. The user may provide messages as received, or the user may modify the originally generated electronic messages. Either case, the electronic messages are displayed to the recipient (sub-user). For an embodiment, this includes sending a user device one or more electronic messages.

The recipient (sub-user) may then act upon the receiving and displaying of the electronic message(s) 710. For an embodiment, the recipient (sub-user) actions based on the displayed electronic message(s) are monitored. For an embodiment, the recipient (sub-user) actions are stored in the action database 745. For an embodiment, a second discriminator model generates a quality rating for each of the displayed electronic messages based on the previously described different recipient (sub-user) actions. For an embodiment, the quality rating of each of the electronic messages is feedback to the generative text engine 734 to additionally influence the generation of the electronic messages.

As previously described, for an embodiment, a filtering discriminator model 795 operates to reduce the number of electronic messages before the electronic messages are displayed to the user 702. For an embodiment, quality ratings of the user actions and/or recipient (sub-user) actions are used to improve the filtering of the filtering discriminator model 795. That is, for example, the filtering of the electronic messages is performed such that the electronic messages having lower quality are filtered out before being displayed to the user of the user server 702 and/or the recipient (sub-user) device 701. The filtering 793 may be supplemented with the filtering control of the filtering discriminator 795. Accordingly, the filtering 793 may be supplemented based on the monitoring of user and sub-user actions.

Figure 8:
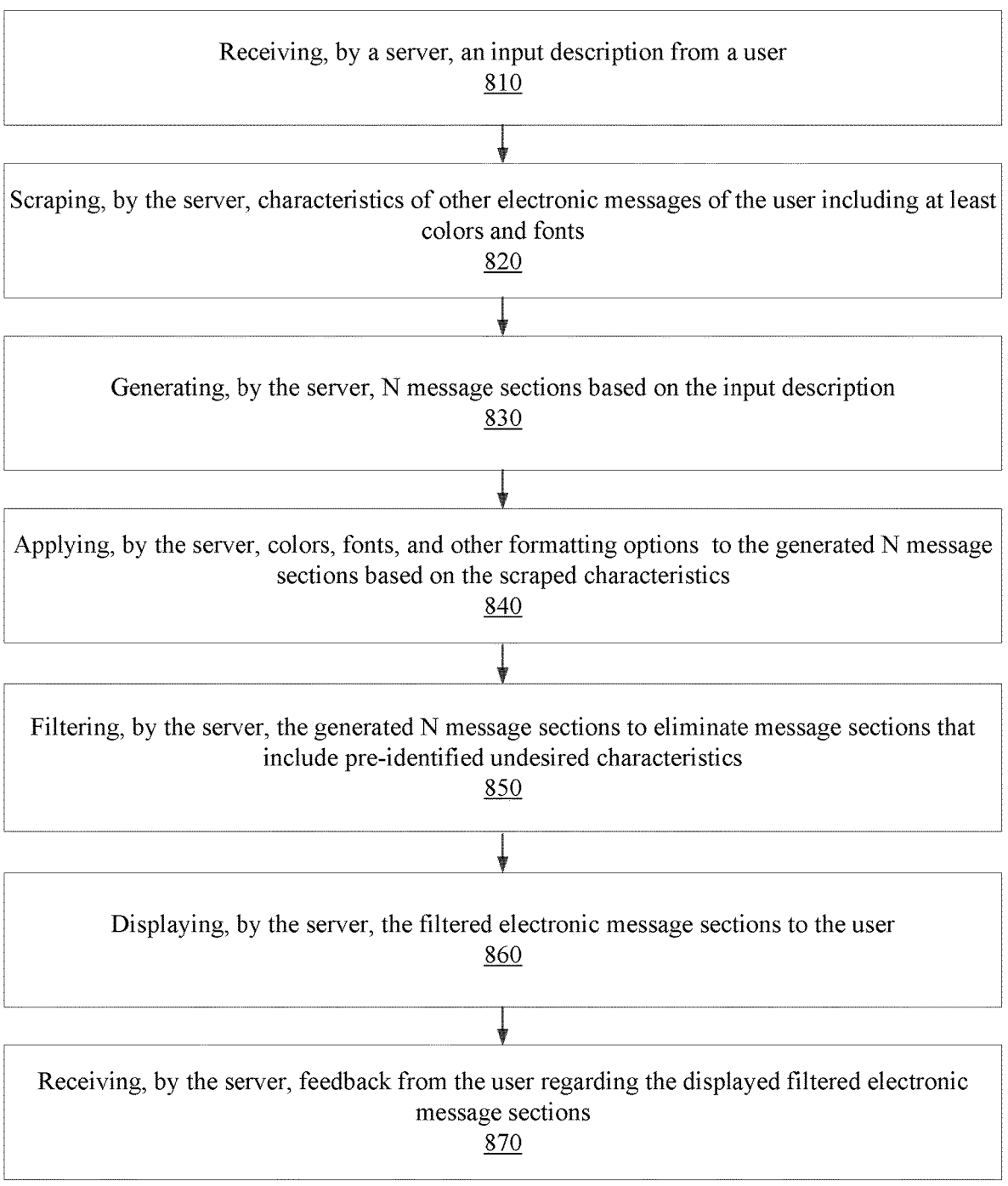
FIG. 8 is a flow chart that includes steps of a method for electronic message generation, according to an embodiment.

FIG. 8 is a flow chart that includes steps of a method for electronic message generation, according to an embodiment. A first step 810 includes receiving, by a server, an input description from a user. The server then may receive a message generation request from the user. A second step 820 includes scraping, by the server, characteristics of at least one electronic message of the user including at least colors and fonts. A third step 830 includes generating, by the server, N message sections based on the input description. A fourth step 840 includes applying, by the server, colors, fonts, and other formatting options to the generated N message sections based on the scraped characteristics. A fifth step 850 includes filtering, by the server, the generated N message sections to eliminate message sections that include pre-identified undesired characteristics. A sixth step 860 includes displaying, by the server, the filtered electronic message sections to the user. A seventh step 870 includes receiving, by the server, feedback from the user regarding the displayed filtered electronic message sections.

Input Description

For an embodiment, the input description includes a text input. For an embodiment, the text input is limited to a set number of characters. However, for at least some other embodiments, the input description includes more than text. For embodiment, the input description includes an email. For example, for an embodiment, the input description includes images, such as, an image of a product. For an embodiment, input description includes an image of an email. For an embodiment, the input description further includes user preferences, such as, color schemes, brand voice, fonts, etc. For an embodiment, the input description can additionally include background images that the message section generator can generate and overlay text to be overlaid on top of the background images.

For an embodiment, the image can include figures, drawings, pictures, etc., but further includes at least some text embedded into the image. For an embodiment, the text of the image is not computer readable. For an embodiment, the server 101 further operates to extract and prioritize the at least text of the image of the input description. That is, the text of the image is extracted from the image. The extracted text is then prioritized based on, for example, the position or location of the text within the image. For an embodiment, the input description can include input data that has worked well in the past in generated electronic messages the solicit feedback from recipient (sub-users). For example, if it was determined that electronic messages in the past that included bright-colored buttons worked very well (high rate of responses from recipients, then the input description may be selected to include an instruction to use bright-colored buttons.

For an embodiment, the server operates to extract and prioritize the text of the image by converting the at least text of the image of the input description into machine-encoded text, and then prioritizing the text of the machine-encoded text based on at least a size and placement of the text of the image. For an embodiment, converting the image of the first channel electronic message includes applying optical character recognition (OCR) to the image. OCR is a technology that recognizes text within a digital image. OCR may be used to recognize text in scanned documents and images. OCR software can be used to convert a physical paper document, or an image into an accessible electronic version with text.

For an embodiment, an OCR algorithm is configured to determine coordinates of a box that includes the text.

Scraping Characteristics

For an embodiment, scraping, by the server, characteristics of other electronic messages of the user comprises scraping code of a current message of the user, scraping code of other messages of the user, and/or scraping code of one or more websites of the user. For an embodiment, the scraping includes code that identifies characteristics of text and images of the messages of the user, and/or a website of the user.

For an embodiment, the scraping provides a determination of preferences of the user. For example, scraping may be used to determine the color preferences of the user. An embodiment includes determining the N (for example, 6) colors that are the most important to the user, and therefore, important to a brand of the user. For an embodiment, the determination is based on scraping code of a current message of the user. For an embodiment, the determination is based on scraping code of other messages of the user. For an embodiment, the determination is based on scraping code of one or more websites of the user. For an embodiment, the color determination is directed to text or wording of the user. An embodiment includes making the determination by counting letters of the messages or websites allocated to each color. An embodiment includes making the determination by counting words of the messages or websites allocated to each color. An embodiment includes determining the top X (such as, two) common background colors. For an embodiment, this includes scraping the code of the messages or websites of the user to determine the percentage of the background that is allocated to each color. An embodiment includes determining the top selectable button colors. For an embodiment, this includes scraping the code of the messages or websites of the user to determine the percentage of the selectable buttons that are allocated to each color. For an embodiment, this includes determining the number of words or the total number of words that are a color or font. For an embodiment, this includes determining the number of letters of the total number of letters are of a color or font. For an embodiment, an electronic message rendering system of the server includes programming code operative to count the number of letters with each color. For an embodiment, the rendering system takes all the code and settings provided by the user and creates an electronic message/message section that is similar to what the recipient (sub-user) would see.

Generating N Message Sections

For an embodiment, this includes a text generation model which generates one or more message sections. The text generation model may include an LLM (large language model) that receives the input description and the branding characteristics. The N messages can be provided to the user which the user can then select one or more of the N messages for generation of the electronic message. As described, for an embodiment the message section generator includes an LLM (large language model) that receives a textual input. However, as described, the input description received from the user is not limited to text. The input description may include images as well. For an embodiment, the input description includes one or more images, and the message section generator includes a MMLLM (multi-modal large language model). For an embodiment, the user feedback and sensed sub-user actions are used for fine tuning the LLM/MMLLM. For an embodiment, the input description includes an image, and the message section generator edits the input image by generating a background and/or text to be associated with the image. For example, the user may input a product image and the message section generator generates a background and text for the product image.

Applying Colors, Fonts, and Other Formatting Options

For an embodiment, the server operates to apply colors, fonts, and other formatting options to the generated N message sections based on the scraped characteristics. The formatting options may include a selectable button width, button border styles, a button border width, padding, a font line spacing, and/or a font size. For an embodiment, the formatting options include any setting that can be applied to control the appearance of a piece of text or other element of the message.

Filtering the Generated N Message Sections

For an embodiment, the server operates to filter the generated N message sections to eliminate message sections that include pre-identified undesired characteristics. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section. For an embodiment, the filtering can be supplemented with a filter discriminator that additionally controls the filtering based on sensed action of the user and/or the sub-users. For example, the scraped characteristics might indicate that a certain percentage of the text of the user messages are blue. An embodiment includes identifying types of messages (sale, product launch, newsletter, etc.) to use what characteristics. For example, the scraping might indicate to always use red square buttons for sale emails, but blue rounded buttons for newsletter emails. An embodiment includes ranking the message sections in addition to filtering based on sub-user actions. For an embodiment, the post-processing corrects a problem that has been identified and then can still displayed to a sub-user. However, for an embodiment, filtering eliminates a message section that includes such a problem.

Displaying the Filtered Electronic Message Sections

For an embodiment, the server operates to display the filtered electronic message sections to the user.

Receiving Feedback From the User

For an embodiment, the server operates to receive feedback from the user regarding the displayed filtered electronic message sections. The feedback may include a selection of one or more of the N message sections. Further, the feedback may include how the sub-user edits the message sections, written feedback, thumbs up and/or thumbs down-type rating which can be feedback to the text generation model. For an embodiment, the feedback may be user dependent. That is, different users may have different selection types. For an embodiment, the different selection types are feedback to the text generation model. That is, for an embodiment, the text generation by the text generation model is different for each user as defined by sensed or determined actions by each of the users.

For an embodiment, the server operates to electronically send the set of generated electronic messages to computing devices of sub-users. For an embodiment, the sub-users 108, 112 have visited a website of the user.

Electronic Message Formation

An embodiment further includes generating electronic messages for the user based on the filtered electronic message sections. For an embodiment, the user selects one or more of the filtered electronic message sections to form one or more electronic messages. That is, the user may select one of the filtered electronic message sections as an electronic message, or the user may configure an electronic message out of a combination of the filtered electronic message sections. The user may indicate a preference for one or more of the filtered electronic message sections. The user may indicate a lack of preference for one or more of the filtered electronic message sections. Further, the user may edit and select one or more of the filtered electronic message sections. Based on feedback from the user, the server may operate to select, adjust, or eliminate at least some of the electronic message sections. Further, the user can create a message that is a mix of generated message sections and other message sections that the user creates.

Communicating Electronic Messages to Sub-Users (Recipients)

For an embodiment, the electronic messages are electronically sent to sub-users. For an embodiment, the sub-users have accessed a website of the user.

Post Processing

At least some embodiment further includes post-processing the generated N message sections. For an embodiment, the post-process includes fixing message sections that include identified issues. For example, it is undesirable for a message section or an electronic message formed from the message section to include text in which text further down in the message section is larger than text higher up in the message section. The post-processing would manipulate the text of each of the N message sections to ensure that no text of each message section is larger than a header of the message section that occurs before the text of the message section.

For an embodiment, when post-processing of one or more of the N message sections is not possible, then the one or more N message sections are eliminated or filtered out. For an embodiment, the post-processing includes fixing issues in which a clear and unambiguous fix can be applied. Again, for an embodiment, if a fix does not exist, then the message section with the issue is eliminated or filtered.

For an embodiment, the application of the post-processing ensures that colors of the message section have sufficient (greater than a preselected threshold) contrast. For an embodiment, the post-processing removes non-allowed html tags from text (for example, there are some HTML tags that could be undesirable. For example, the message section generator could create a button tag inside of a text block, which can be confusing). For an embodiment, the post-processing removes attributes of tags if any were written by a generator of the message sections. For an embodiment, the post-processing removes empty columns of a multi-column layout.

As described, for an embodiment, the post-processing attempts to fix issues identified after the generation of the N message sections based on the input description. For an embodiment, issues that cannot be resolved are eliminated. That is, an embodiment includes eliminating electronic message sections that include characteristics that have been previously identified as improper.

At least some embodiments further include updating the generating of the N message sections based on the feedback from the user. For an embodiment, the feedback from the user includes selections of one or more of the message sections which are then incorporated into an electronic message that can be delivered to one or more sub-users. The selections, however, show preferences for selected of the N message sections. These preferences can be feedback to a generator of the message sections to train the generator in the generation of future messages.

For an embodiment, the message generator generates one or more rough designs of the message sections and the server is configured to display the one or more rough designs. Subsequently, the server allows the user to give feedback and guide the message sections creation process, and/or allow the user to use the generator to iterate on designs of the message sections after the message sections are created, which could be fed back to the message section generator. For an embodiment, the message section generator includes at least one model, and the feedback from the user is used to update the one or more models. For an embodiment, over time, the server is configured to customize to each user based on what the user liked and didn't like (via feedback button, and/or via what the user did or did not choose to insert, or based on how the chose to edit one or more of the message sections. For an embodiment, the server is configured with the message section generator to customize generated content based on how users respond to prior content from that brand shown to the user by the model.

As described, for an embodiment, the server is configured to display the filtered and post-processed electronic message sections to the user. For an embodiment, up to M (for example, 3) of the remaining generations are then shown to the user via a carousel preview in the model. If the user likes one of the M options, then the user can select "Insert draft" and the selected section will be inserted into an electronic message of the user. Alternatively, the user can go back to the section description and attempt to update their description and regenerate M new options. Once completed, the electronic message is electronically sent to sub-users of the user.

For an embodiment, a separate, rules-based approach is applied to select, for example, the color palette, the header and body fonts, and the button-design applied to each of the generated sections. For an embodiment, the color palette is provided to the message section generator. The rule-based approach ensures that the eventual electronic message will have a sufficient color contrast to meet web accessibility guidelines and aesthetics.

As described, for an embodiment the message section generator includes an LLM (large language model) that receives a textual input. However, as described, the input description received from the user is not limited to text. The input description may include images as well. For an embodiment, the input description includes one or more images, and the message section generator includes a MMLLM (multi-model large language modal). For an embodiment, the user feedback and sensed sub-user actions are used for training the MMLLM.

As described, the feedback from the user can be used as the basis for one or more electronic messages that are sent to recipients (sub-users). For an embodiment, the one or more electronic messages are each formed by the user selections of one or more of the generated message sections. That is, an embodiment includes generating electronic messages for sending to sub-users based on the filtered electronic message sections. The user may select a single message section as an electronic message, or the user may select multiple messages sections as a single electronic message.

At least some embodiments include electronically sending the electronic messages to sub-users of the users. At least some embodiments include monitoring and tracking, by the server, responses of the sub-users to receiving the electronic messages, determining, by the server, a level of success of each of different of the electronic messages, and updating the generating of the N message sections based on the determined level of success of each of different of the electronic messages. As described, for an embodiment, the sub-users have visited a website of the user. Further, for an embodiment, when the sub-user loads a webpage, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user's internet browser or device (that would affect communication of a message or a sub-user's desired action) can be monitored or tracked. For an embodiment, navigation by the sub-user to a website or URL (universal resource locator) can be sensed, tracked, and monitored.

As described, the monitoring of the sub-user actions can be used to determine a level of success of each of the electronic messages that were generated by the message sections. Accordingly, the value or success of each of the electronic messages and the corresponding message sections can be determined. For an embodiment, updating the generating of the N message sections includes feeding back the level of success of each of the different electronic messages to a generator that generated the N message sections.

Further, for an embodiment, different variations of the electronic messages can be tested against each other to allow a determination of what adjustments or parameter selections associated with the generation of the message sections and the electronic messages are more successful in soliciting a response from the recipient (sub-users). An embodiment further includes suggesting, by the server, two or more versions of the electronic messages, electronically sending the two or more versions of the electronic messages to sub-users, monitoring actions of the sub-users in response to receiving the two or more versions of the electronic messages and ranking the two or more versions of the electronic messages based on the monitored actions.

As previously described, the different variations may include different textual content, different color schemes, different layouts, different imagery, different send times, different lists of recipients, and/or different combinations of selected message sections. For an embodiment, the actions of the recipients (sub-users) of the different variations of the message sections and form electronic messages are tracked to determine which of the variations are more successful in soliciting responses of the recipients (sub-users). The success of the different responses can be ranked, and the ranking can be used to select the variations of future message sections and form electronic messages. That is, for an embodiment, the generator of the message section is trained based on the ranking of the two or more versions of the electronic messages. The ranking may influence the full management system that includes the message section generator.

FIG. 9 shows electronic messages, wherein each electronic message includes different content or behavior, according to an embodiment. For an embodiment, a display 910 of an electronic message 906 includes an input from a recipient (sub-user (site visitor), and an electronic message 908 that provides a user input through, for example, a selection, such as, through a mouse click. A display 920 includes an electronic message 909 that changes positions on the display between times t1 and t2, and an electronic message 911 that "pops up" a time t3 after the electronic message 911 has been loaded. Clearly, other electronic messages having different content and behavior can be utilized. As shown, for an embodiment, the different electronic messages operate to control a display of the electronic messages on a display of a computing device (such as, computing devices 104, 106) of sub-users (such as, recipients) 108, 112). As stated, for an embodiment, the different electronic messages provide the electronic communications of the A/B testing.

For an embodiment, the electronic message includes a file configured to receive an input from a recipient of the electronic message. For an embodiment, the required input includes at least one or more of the recipients clicking to a different page, or the recipient entering information. For an embodiment, the electronic message is distinct from an underlying website which may include a dynamic and interactive page. For an embodiment, the electronic messages are distinct from the underlying website because the electronic messages appear visually and/or behaviorally distinct from the underlying page. For example, the behavior of the electronic message may include the electronic message popping up after the page is loaded or sliding out from the side after the rest of the page has been loaded. As previously described, the different templates of the A/B test control the behavior of the electronic message, and accordingly, control the display of a recipient of the electronic message.

Templates of Electronic Messages

For an embodiment, A/B testing includes N variations (arms) of templates that define electronic messages. For an embodiment, each of N templates includes a set of data objects that combine to represent a structure of an electronic message. As described, the first and second templates of the N templates of the electronic message each have a different content, a different send time, and/or a different behavior. The different displays of the mobile message can include a changing display, such as, movement or varying display intensity. Accordingly, the set of data objects of each of the first and second templates combine to represent a structure of electronic messages having a different content, different send times, or different behavior of the mobile messages. For an embodiment, the structure of the electronic message includes the content, the send time, or the behavior control. For an embodiment, the templates additional include information pertaining to testing of the mobile message(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the messages 906, 908, 909, 911 may be electronic messages. For an embodiment, the electronic messages require an input. A first display of a computing device of an electronic message recipient includes an electronic message 906 that requires an input from a user (electronic message recipient) and an electronic message 908 that requires a user input through, for example, a selection, such as, through a click. A second display includes an electronic message 909 that changes on the display between times t1 and t2, and an electronic message 911 that is delivered a time t3 after the electronic message has been sent. Clearly, other electronic messages having different content, send times, and behavior can be utilized. For an embodiment, templates that have different send times are sent to the electronic message recipients at different times. For an embodiment, a different send time of the first template and the second template include a first send time for the first template and a second send time of the second template. For an embodiment, messages received at different times during the day may be more or less likely to achieve success, based on trends observed in both electronic messages and email. That is, electronic message recipient behavior can be observed by prior electronic messages to the electronic message recipient, or other types of electronic mail sent to the electronic message recipient. Based on the observer (sensed) prior behavior of the electronic message recipient, the first and second send times can be selected. Further, there can be legal restrictions on send times, which influence the times the server selects for the first and second send times.

For an embodiment, the electronic message includes a file configured to receive an input from an electronic message recipient. For an embodiment, the required input includes at least one or more of the customers (site visitor) clicking to a different page, or the customer entering information. However, as previously mentioned, sensors of mobile devices of the electronic message recipients can be utilized to determine or detect actions of the electronic message recipients that indicate changes in behavior of the electronic message recipient due to receiving the electronic messages of the different templates.

An embodiment includes counting the successes of the electronic message sent to electronic message recipients of, for example, a group 1 and a group 2 according to a template 1 and a template 2. As previously described, for an embodiment, successes of the electronic messages generally include determining how many of the electronic message recipients of the electronic messages are sensed and tracked or determined to have performed a task of the electronic message. For an embodiment, the tracked and monitored activities of the electronic message recipients are online activities. For an embodiment, mobile devices of the electronic message recipients are tracked, and the tracked and monitored activities include locations and motions of the electronic message recipients.

For an embodiment, the electronic message recipients are obtained by tracking information of electronic message recipients to the user website managed by the user of the user server 140. For an embodiment, the electronic message recipients include recent electronic message recipients. For an embodiment, recent electronic message recipients include electronic message recipients that have visited the user website within a predetermined time-period. For an embodiment, electronic message recipients include a selected number of most recent user website visitors. For an embodiment, recent site visitors include electronic message recipients since a specific event. For an embodiment, the specific event may include, for example, a large change in the settings of a template test. For an embodiment, the assignment is random with equal probabilistic distributions within each geographical region that the test is sent to. For example, the electronic message may be sent to electronic message recipients from N different geographical regions. For an embodiment, an equal number (or near equal) of electronic messages is sent to each of the geographical regions, but randomly sent to the electronic message recipients within each of the regions. For an embodiment, the assignment is deterministic but equally distributed within each of the geographical regions. For example, a first template 1 can be assigned to a first member of the list of planned electronic message recipients, a second template 2 can be assigned to a second member of the list of planned electronic message recipients, and the first template can be assigned to a third member of the list of planned electronic message recipients, and so on.

For at least some embodiments, an eligibility of the electronic message recipient is determined dynamically by a combination of a geolocation of the electronic message recipient, transactional (for example, purchase confirmation, delivery confirmation) vs. marketing purpose of the electronic message, and recency of the last electronic message received. For example, only electronic message recipients who have not received a marketing email and/or marketing electronic message within the past 24 hours (or some other predetermined or adaptive time period X) are eligible to receive this message. For an embodiment, the planned electronic message recipients are determined when an electronic message is scheduled for transmission to the electronic message recipients. For an embodiment, when the electronic message is sent, the time that each planned electronic message recipient received their most recent marketing electronic message is determined, and only those electronic message recipients that have not received an electronic message in the past X hours are deemed eligible electronic message recipients.

For an embodiment, content in the template(s) is dynamically updated based on actions or characteristics of the sub-user (recipient). For example, different images or content of electronic messages of the templates are sent to the electronic message recipients based on the last product that an electronic message recipient browsed. Further, the mobile devices of the electronic message recipients can be tracked and monitored. For an embodiment, the content of the templates is additionally updated by physical location and activities of the electronic message recipients. The physical location and the activities can be sensed and/or identified based on locations and motion sensed by sensors of the mobile devices of the electronic message recipients.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the electronic message recipient actions of the first template of the electronic message and the second template of the electronic message.

As previously described, the described embodiments solve practical problems associated with automatically generating by a server or computing apparatus electronic messages that are likely to solicit a response from recipients (sub-users) of the electronic messages. Further, the described embodiments further solve practical problems associated with automatically identifying messages and characteristics (including a behavior) of messages that are more or less likely to solicit the response from the recipients (sub-users). Further, the described embodiments further solve practical problems associated with tuning the generation and other characteristics of the electronic messages based on preferences and actions of users who input a description for the electronic messages and based on tracking and monitoring the actions of recipients (sub-users) of the electronic messages. The different electronic messages may include different content and/or behavior. For an embodiment, the behavior can include the behavior of the display of the different electronic messages being different. For example, the display of different electronic messages may include motion of the display of the electronic messages. Accordingly, based on the sensed behavior of recipients of the electronic messages, the display may selectively vary. As shown in FIG. 9, the different behaviors of the electronic messages can include different motion and/or placement of features within a display of the electronic messages. For example, a selectable button within the display of the electronic messages can be located on the displays of the electronic messages based on the tracked actions and responses of the sub-users upon receiving the electronic messages. Locations and motions of the features of the displayed electronic messages can be adjusted based on the evaluated success of electronic messages having different locations and motion. Clearly other features, such as, text size, text location, text motion, fonts, colors, can additionally or alternatively be selected.

Although specific embodiments have been described and illustrated, the embodiments are not to be limited to the specific forms or arrangements of parts so described and illustrated. The described embodiments are to only be limited by the claims.

What is claimed:

1. A method of electronic message generation, comprising:

receiving, by a server, an input description from a user;

receiving, by the server, a message generation request from the user;

scraping, by the server, characteristics of at least one electronic message of the user including at least colors and fonts;

generating, by a text generation model of the server, N message sections based on the input description;

applying, by the server, colors, fonts, and other formatting options to the generated N message sections based on the scraped characteristics;

filtering, by the server, the generated N message sections to eliminate message sections that include pre-identified undesired characteristics;

displaying, by the server, the filtered electronic message sections to the user;

receiving, by the server, feedback from the user regarding the displayed filtered electronic message sections;

generating, by the server, electronic messages for sending to sub-users based on the filtered electronic message sections, wherein the sub-users have visited a website of the user;

electronically sending the electronic messages to sub-users of the user;

monitoring and tracking, by code downloaded to a browser of each of the sub-users, responses of the sub-users to receiving the electronic messages; and adaptively adjusting a timing of electronic sending of the electronic messages based on the monitored and tracked responses of the sub-users.

2. The method of claim 1, wherein scraping, by the server, characteristics of other electronic messages of the user comprises scraping code of a current message of the user, scraping code of other messages of the users, and scraping code of one or more websites of the user.

3. The method of claim 1, further comprising:

determining, by the server, a level of success of each of different of the electronic messages;

updating the generating of the N message sections based on the determined level of success of each of different of the electronic messages.

4. The method of claim 1, further comprising:

suggesting, by the server, two or more versions of the electronic messages;

electronically sending the two or more versions of the electronic messages to sub-users;

monitoring actions of the sub-users in response to receiving the two or more versions of the electronic messages; and ranking the two or more versions of the electronic messages based on the monitored actions.

5. The method of claim 4, further comprising training a generator that generated the N message sections based on the ranking the two or more versions of the electronic messages.

6. The method of claim 1, further comprising adaptively adjusting a list of recipients that are sent the electronic messages based on the monitored and tracked responses of the sub-users.

7. The method of claim 1, further comprising adaptively adjusting a motion of a display of the electronic messages based on the monitored and tracked responses of the sub-users.

8. The method of claim 1, further comprising:

determining top selectable button colors for the electronic messages, comprising:

scraping code of electronic messages and websites of the user to determine a percentage of selectable buttons allocated to each color;

wherein the electronic messages are generated to include button colors having a largest percentage.

9. The method of claim 1, further comprising:

determining top color preferences of the user, comprising scraping code of a current message of the user, scraping code of other messages of the users, and scraping a website of the user.

10. The method of claim 1, further comprising:

determining top color preferences of the user, comprising counting letters of the messages or websites of the user allocated to each color, and counting words of the messages or the websites allocated to each color.

11. The method of claim 1, further comprising:

determining top X common background colors comprising scraping the code of messages and websites of the user to determine the percentage of background allocated to each color for the generated electronic messages.

12. The method of claim 1, wherein adaptively adjusting the timing of electronic sending of the electronic messages based on the monitored and tracked responses of the sub-users comprises:

sending first messages at a first time;

sending second messages at a later time; and determining a sequence of timing of the sending of the first electronic messages and the second electronic messages based on which of the first electronic messages or the second electronic messages is more effective for each sub-user.

13. An apparatus for electronic message generation, comprising:

a user server;

a management server electronically connected to the user server through a network, the management server configured to:

receive an input description from a user;

receive a message generation request from the user;

scrape characteristics of at least one electronic message of the user including at least colors and fonts;

generate N message sections based on the input description;

apply fonts, and other formatting options to the generated N message sections based on the scraped branding characteristics;

filter the generated N message sections to eliminate message sections that include pre-identified undesired characteristics;

display the filtered electronic message sections to the user;

receive feedback from the user regarding the displayed filtered electronic message sections;

generate electronic messages for sending to sub-users based on the filtered electronic message sections, wherein the sub-users have visited a website of the user;

electronically send the electronic messages to sub-users of the user;

wherein code downloaded to a browser of each of the sub-users monitors and tracks responses of the sub-users to receiving the electronic messages; and wherein the management server is further configured to adaptively adjust a timing of electronic sending of the electronic messages based on the monitored and tracked responses of the sub-users.

14. The apparatus of claim 13, wherein scraping, by the server, characteristics of other electronic messages of the user comprises scraping code of a current message of the user, scraping code of other messages of the users, and scraping code of one or more websites of the user.

15. The apparatus of claim 13, wherein filtering the generated N message sections comprises:

eliminating, by the server, electronic message sections that include characteristics that have been previously identified as improper.

16. The apparatus of claim 13, wherein the management server is further configured to:

update the generating of the N message sections based on the feedback from the user.

17. The apparatus of claim 13, wherein the management server is further configured to:

determine a level of success of each of different of the electronic messages; and update the generating of the N message sections based on the determined level of success of each of different of the electronic messages.

18. The apparatus of claim 17, wherein updating the generating of the N message sections comprises:

feeding back the level of success of each of the different electronic messages to a generator that generated the N message sections.

19. The apparatus of claim 13, wherein the management server is further configured to:

suggest two or more versions of the electronic messages;

electronically send the two or more versions of the electronic messages to sub-users;

monitor actions of the sub-users in response to receiving the two or more versions of the electronic messages; and rank the two or more versions of the electronic messages based on the monitored actions.

20. The apparatus of claim 19, wherein the management server is further configured to:

train a generator that generated the N message sections based on the ranking of the two or more versions of the electronic messages.

* * * * *